2,928,722

PROCESS FOR THE FRACTIONAL DISTILLATION OF INORGANIC HALIDES

Walter Scheller, Neuewelt, near Basel, Switzerland, assignor to Ciba Limited, Basel, Switzerland, a Swiss firm No Drawing. Application August 9, 1957
Serial No. 677,225

Claims priority, application Switzerland August 15, 1956

14 Claims. (Cl. 23—17)

This invention provides a process for the distillation of anhydrous inorganic halides of the elements of the fifth group of the periodic system. It concerns primarily, for example, the fractional distillation of niobium and/or tantalum pentachlorides.

In the fractional distillation of inorganic halide mixtures of the elements of the fifth group of the periodic system, it is known that the presence of such difficultly volatile metal halides as are solid at room temperature or at elevated temperature and therefore tend to the formation of incrustations, is a disturbing feature. After the distillation of the more easily volatile fractions from such a halide mixture, the presence of higher melting and more difficultly volatile halides, which remain behind in the distillation vessel and become more concentrated therein, often causes a more or less transient incrustation which very much impedes the smooth course of the distillation since it prevents a homogeneous heat transfer thus causing local over-heating at the walls of the distillation vessel, and at the same time excludes the desired effect of removal of the distillation radical in the fluid phase from the distillation vessel. In the distillation of niobium and/or tantalum pentachloride mixtures containing ferric chloride, for example, ferric chloride passes into the vapour phase by sublimation to a greater extent than would be expected from its vapour pressure at the temperature concerned and renders more difficult or entirely prevents the production of a distillate free from iron.

The present invention is based on the observation that in a surprising manner these disadvantages can be largely avoided by simple means when the distillation is carried out in the presence of a fluxing material. According to the invention a fluxing material is added to the halide mixture to be distilled and the distillation is carried out under anhydrous conditions, preferably under normal pressure but if desired also under reduced pressure or under excess pressure.

As fluxing materials are concerned in the present process anhydrous salts and/or mixtures thereof that are liquid at the distillation temperature of the constituents to be distilled off from the halide mixtures, which salts on the one hand strongly reduce the partial pressure of the chlorides tending to incrustation and on the other also strongly reduce the melting point of the halide mixture. As such salts there should be primarily mentioned anhydrous, high boiling metal halides or coordination compounds of metal halides such as their thermally stable double salts or adducts. Advantageously such fluxing agents or mixtures thereof are selected as are themselves liquid at the distillation temperature or form a melt with the more difficultly volatile constituents of the halide mixture to be distilled and boil at a higher temperature than the constituents to be distilled out of the halide mixture. With advantage such fluxing agents are used as do not react with the halides to be distilled off or only form such compounds as are split up again into their original components at the distillation temperature. Thus, for example, there are selected as fluxing agents in the fractional distillation of mixture of niobium and tantalum pentachloride, anhydrous metal halides or their co-ordination compounds of higher order, for example their double salts or adducts that do no react with the pentachlorides and have a higher boiling point than niobium pentachloride.

Such halides are unsuitable as form stable or difficultly fusible double salts with the pentachlorides, or such as give co-ordination compounds that sublime.

As especially valuable fluxing agents for use in the present process have proved the adducts of phosphorus oxychloride that boil higher than $NbCl_5$. As such should be primarily mentioned the phosphorus oxychloride adduct of anhydrous aluminum chloride and mixtures containing the same or mixtures of such adducts with anhydrous metal halides, especially a mixture of the phosphorus oxychloride-aluminum chloride adduct with anhydrous aluminum chloride. Instead of this phosphorus-containing adduct, which although being very suitable is volatile above 300° C. under normal pressure, there can be used with advantage as fluxing agents the alkali metal or alkaline earth metal halide double salts of iron, zirconium and/or hafnium halides, for example the double salt of the formula $Na[FeCl_4]$ and that of the formula $Na[AlCl_4]$. Other phosphorus-containing adducts are also valuable in the instant process. These include the thermically stable adducts of phosphorus oxychloride with hafnium tetrachloride and of phosphorus oxychloride with zirconium tetrachloride ($3ZrCl_4 \cdot 2POCl_3$). This last mentioned adduct was described by B. Dustman and F. Kenze in "The Metallurgy of Zirconium," 1955. All of these adducts may be obtained in a similar manner, e.g. by solubilizing the metal chlorides in an excess of $POCl_3$, thereafter vaporizing the excess $POCl_3$ and distilling the remaining adduct.

The halide mixtures to be fractionally distilled in the presence of a fluxing agent by the process of the invention are obtained by methods known per se. There are primarily concerned chlorination mixtures obtained by chlorination of natural products, especially oxidic ores of the elements of group five of the periodic system in the presence of an oxygen-binding agent such as carbon. The present process is especially suitable for the fractional distillation of halide mixtures containing niobium and tantalum halides. Such mixtures can be obtained, for example, by chlorination of materials containing niobium and tantalum in oxidized form, for example slags and especially concentrates and ores which have if desired been subjected to concentration treatment, or oxide mixtures of these two metals, the chlorination being carried out with chlorine gas and a reducing agent such as carbon. For this purpose, for example, the mixtures of oxides of niobium and tantalum available on the market, or also the natural products, which usually contain the two elements in the form of their oxides, can be formed into briquettes with carbon and these then treated with chlorine gas at 400–1,000° C. in a shaft or tube furnace. The resulting chlorination products, which may contain considerable quantities of niobium oxychloride, can be subjected to a further chlorination with chlorine gas in the presence of carbon so that a complete conversion of the oxychlorides into pentachlorides is achieved. The major quantities of the chlorides, likewise produced in the chlorination, of any elements that may be present in the starting materials together with niobium and tantalum, and the compounds of which are usually present as impurities, for example the chlorides of the elements titanium, tin, manganese and so on, can be partially removed for example by regulating the temperature in the chlorination and in the condensation chamber of the chlorides of niobium and tantalum, in such a manner that the chlorides of the accompanying elements, of which the boiling or vaporisation points are usually widely different from those of niobium and tantalum chlorides, are largely separated from the latter.

In the resulting mixtures containing niobium and tantalum pentachloride there usually remain more or less considerable quantities of ferric chloride, the tendency of which to incrustation or sublimation causes difficulties in the customary fractional distillation which can easily be avoided in the present process. The unobjectionable distillation by the process of this invention of the resulting mixtures of chlorination products is carried out in such a manner that admixture takes place with the chlorination products, before the distillation, of at least one of the specified fluxing agents, for example the aluminum chloride-phosphorus oxychloride adduct or the ferric chloride-sodium chloride double salt or the aluminum chloride-sodium chloride double salt. The quantity of the fluxing agent to be used can vary within wide limits. Advantageously at least so much of the aluminum chloride adduct is used as is necessary so that the melt in the distillation flask remains mobile until the end of the distillation. It has been shown, for example, that in the case where the incrustation is caused by the presence of ferric chloride, a quantity of adduct of about one third of the incrustation-forming halide present is required. The adduct of phosphorus oxychloride ($POCl_3$) with aluminum chloride ($AlCl_3$) to be used as fluxing agent in the fractional distillation of niobium and tantalum pentachlorides, is advantageously added to the mixture before the commencement of the distillation. It can, however, also be formed in situ, for example by adding phosphorus oxychloride to a mixture containing aluminum chloride or, if aluminum chloride is not present in the halide mixture to be distilled, by adding separately from one another both aluminum chloride and phosphorus oxychloride. The double salt of the formula $Na[FeCl_4]$ can likewise be formed in situ.

Thus, for example, by addition of a measured quantity of dry, finely powdered sodium chloride, the double salt can be formed during the distillation in the distillation vessel when the crude halide mixture to be distilled contains ferric chloride. By this means the partial pressure of the ferric chloride is essentially reduced and its separation from the more easily volatile halides is facilitated. In an analogous manner double salts are formed with sodium chloride and $AlCl_3$, $ZrCl_4$ or $HfCl_4$, so that after the separation of the more easily volatile halides the distillation residues consist essentially of mixtures of such double salts. According to their compositions these have melting ranges of 100–170° C., for example the Fe-double salts of 120–150° C. The quantity of the sodium chloride added can be varied within relatively wide limits and naturally depends upon the composition of the crude chloride mixture. If the difficultly volatile products consist chiefly of $FeCl_3$, then there is added to the crude halide mixture per 1 mol of $FeCl_3$ 0.02 to about 1.5 mol of NaCl, but preferably only 1 mol of NaCl is added.

In addition to sodium chloride and the mentioned phosphorus oxychloride adducts there are also concerned as fluxing agents all those salts that form double salts with $FeCl_3$, $AlCl_3$ and $ZrCl_4$ of which the melting point in the pure state or when mixed with excess of heavy metal halide, is lower than the boiling point of niobium pentachloride but which form with the more difficultly volatile metal halides at 200–300° C. more stable double salts than with niobium pentachloride and tantalum pentachloride.

As an example, potassium chloride forms with $FeCl_3$, $ZrCl_4$, $NbCl_5$ and $TaCl_5$ double salts such that the decomposition pressure of $K[TaCl_6]$ and $K[NbCl_6]$ at 200–300° C. is substantially less than that of the corresponding NaCl-double salts but larger than that of $K[FeCl_4]$ and $K_2[ZrCl_6]$. By a measured addition (calculated on $FeCl_3$) potassium chloride is likewise concerned and likewise LiCl, RbCl and CsCl, although the latter are less interesting on economic grounds.

Distillation according to the invention can be carried out under excess pressure, under reduced pressure or advantageously under normal pressure and obviously under anhydrous conditions, if desired in an inert atmosphere. Thus a chlorination mixture obtained by chlorination of a niobium-tantalum ore in the presence of carbon, after the addition of sodium chloride or of aluminum chloride-$POCl_3$ adduct can first have separated from it the lower boiling fractions in a first fraction consisting for example, of titanium tetrachloride, silicon tetrachloride and tin tetrachloride, and then at 230–260° C. the niobium and tantalum pentachlorides, which distill in this range, collected if desired separately from one another. The melt remains liquid until the end of the distillation. Ferric chloride, aluminum chloride and zirconium chloride are almost entirely retained in the melt, together with the higher boiling chlorides. Incrustation and sublimation are reduced to a minimum.

For the recovery of the difficultly volatile metal halides from the distillation residues containing sodium chloride, these residues can be thermally split by heating to 250–900° C. This can take place in a dry inert atmosphere, for example in a stream of nitrogen, in a stream of chlorine or in a chlorinating atmosphere, for example in the presence of phosgene or of carbon tetrachloride. By this means the metal halides vaporize in accordance with their sublimation or boiling point or according to the decomposition pressure of the double salts. By suitable selection of the temperature, obviously a fractional vaporization can be carried out, as a result of which from the difficultly volatile distillation residues the individual metal halides can be obtained in a more concentrated or entirely separated form. As residue of this decomposition sodium chloride remains and can be used as addition in further crude chloride distillations.

The possibility also exists of extracting the finely powdered residues with anhydrous solvents in which the heavy metal halides are easily soluble but sodium chloride is difficultly soluble (for example with alcohols, ketones, ethers, esters and so on).

The following examples illustrate the invention, the parts and percentages being by weight.

*Example 1*

Using a furnace with an internal diameter of 60 mm., pre-heated to 700° C., briquettes made from 80 parts of columbite ore and 20 parts of soot are chlorinated in a continuous stream of chlorine of 1 liter per minute. The temperature in the chlorination furnace is maintained at about 750° C. during the reaction and the hot chlorination products, for the purpose of conversion of oxychlorides present therein into pentachlorides, are again treated with chlorine in the presence of carbon until the reaction is complete.

250 parts of the resulting solid chlorides containing iron chloride are mixed with 50 parts of the adduct prepared from phosphorus oxychloride and anhydrous aluminum chloride and subjected to fractional distillation in an atmosphere of carbon dioxide. The lower boiling fractions ($TiCl_4$, $SnCl_4$, $SiCl_4$ etc.) are collected separately in a first fraction. The mixture of niobium and tantalum pentachloride distilled between 230 and 260° C. is cooled in an air-cooled condenser to room temperature and examined for iron, phosphorus and aluminum. Phosphorus can only be deteced in traces, its presence being obviously due to distillation of the aluminum adduct in small quantity. The content of the remaining constituents is of the order of 0.1%. The quantity of niobium and tantalum pentachloride separated in this manner amounts to about 97–98%.

In a further operation using a better fractionating column under conditions that are as far as possible adiabatic, a practically phosphorus-free niobium/tantalum pentachloride fraction can be obtained which is likewise practically free from aluminum and iron.

Instead of cooling the air-cooled condenser to room temperature, for example by using boiling triethyl phosphate as cooling agent, the chlorides can be cooled only to about 210° C. At this temperature the chlorides are still liquid and can be worked up more easily than in the solid condition.

*Example 2*

By chlorination of columbite ores a crude chloride mixture is obtained with a content of 15% of ferric chloride calculated on the solid chloride mixture. To 3,000 parts of these crude chlorides are added 185 parts of dry finely powdered sodium chloride. The resulting mixture is introduced into a distillation vessel and subjected to fractional distillation at 230-260° C. whereby 2340 parts of a mixture of niobium and tantalum pentachloride is obtained.

When the distillation is complete, there remain as residue in the distillation vessel 840 parts of a brown, easily mobile melt which on cooling solidifies.

For the recovery of the more difficultly volatile metal halides and the sodium chloride, the residue is heated in a stream of chlorine to 480° C. By this means 210 parts are obtained of a sublimate consisting to a preponderating extent of niobium pentachloride with small quantities of zirconium tetrachloride and less than 0.1% of iron.

The temperature is then raised to 650° C. and a mixture of $FeCl_3$ with a little $ZrCl_4$ is collected. The residual sodium chloride now contains only small quantities of volatile metal halides and can be used directly for addition to a further crude chloride mixture.

What is claimed is:

1. A process for the distillation of a metal halide mixture containing niobium and tantalum pentachloride and also containing iron, wherein an anhydrous adduct thermically stable up to 300° C. of phosphorous oxychloride with aluminum chloride is added to the mixture, the distillation is carried out under atmospheric pressure and niobium and tantalum chlorides are separately collected.

2. A process as claimed in claim 1 wherein the adduct having the formula $AlCl_3 \cdot 1POCl_3$, and having a M.P. of 181° C. and a B.P. of 217° C. at 14 mm./Hg is used.

3. A process for the distillation of a metal halide mixture containing niobium and tantalum pentachloride and also containing iron comprising: (1) adding to the mixture a sufficient amount of anhydrous adduct of phosphorus oxychloride with aluminum chloride to maintain the resulting mixture in a liquid state throughout the distillation, said adduct being thermically stable up to 300° C., (2) distilling said resulting mixture at atmospheric pressure, and (3) separately collecting niobium- and tantalum-containing fractions.

4. A process for the separation of niobium and tantalum values from a mixture of their halides with difficultly volatile halides of other metals by fractional distillation comprising: (1) adding to the mixture anhydrous thermically stable adduct of phosphorus oxychloride with zirconium tetrachloride, (2) distilling the resulting mixture under inert and anhydrous conditions, and (3) separately collecting niobium and tantalum fractions.

5. A process as claimed in claim 4 wherein the adduct having the formula $3ZrCl_4 \cdot 2POCl_3$ is used.

6. A process for separating niobium and tantalum values from a mixture of their halides with difficultly volatile halides of other metals by fractional distillation comprising: (1) adding to the mixture an anhydrous alkali metal halide which forms a double salt with aluminum halide, zirconium halide and hafnium halide, (2) distilling the resulting mixture under inert and anhydrous conditions, and (3) separately collecting niobium and tantalum fractions.

7. A process for separating niobium and tantalum values from a mixture of their halides with difficultly volatile halides of other metals by fractional distillation comprising: (1) adding to the mixture an anhydrous alkaline earth metal halide which forms a double salt with aluminum halide, zirconium halide and hafnium halide, (2) distilling the resulting mixture under inert and anhydrous conditions, and (3) separately collecting niobium and tantalum fractions.

8. A process for the separation of niobium and tantalum values from a mixture of their halides with difficultly volatile halides of other metals by fractional distillation comprising: (1) adding to the mixture anhydrous sodium chloride, (2) distilling the resulting mixture under inert and anhydrous conditions, and (3) separately collecting niobium and tantalum fractions.

9. A process as claimed in claim 8 wherein the amount of sodium chloride added is so adapted to the content of the melt of ferric chlorides that a eutectic mixture of NaCl and $FeCl_3$ is formed.

10. A process for separating niobium and tantalum values from a mixture of their halides with difficultly volatile halides of other metals by fractional distillation comprising: (1) adding to the mixture an anhydrous alkali metal halide which forms a double salt with one of the difficultly volatile halides, (2) distilling the resulting mixture under inert and anhydrous conditions, and (3) separately collecting niobium and tantalum fractions.

11. A process for separating niobium and tantalum values from a mixture of their halides with difficultly volatile halides of other metals by fractional distillation comprising: (1) adding to the mixture an anhydrous alkaline earth metal halide which forms a double salt with one of the difficultly volatile halides, (2) distilling the resulting mixture under inert and anhydrous conditions, and (3) separately collecting niobium and tantalum fractions.

12. A process for the fractionation of anhydrous chlorides of niobium and tantalum by distillation in the presence of a less volatile metal halide comprising the steps of carrying out the distillation in presence of sodium chloride which is added to the mixture to be distilled in a proportion of from .02 to 1.5 mols of sodium chloride per mol of ferric chloride present and separately collecting niobium and tantalum fractions.

13. A process according to claim 12 wherein the less volatile metal halide is ferric chloride.

14. A process for the separation of niobium and tantalum values from mixtures of their halides with difficultly volatile halides of other metals by fractional distillation, comprising the steps of: adding to the mixtures an anhydrous fluxing agent which is the thermically stable adduct of phosphorus oxychloride with hafnium tetrachloride, said agent strongly reducing the partial pressure of the difficultly volatile halides and the melting point of the mixtures, distilling the resulting mixtures under inert and anhydrous conditions, and separately collecting niobium and tantalum fractions.

No references cited.